United States Patent
Fukuda et al.

(10) Patent No.: US 12,062,954 B2
(45) Date of Patent: Aug. 13, 2024

(54) STATOR OF ROTARY ELECTRIC MACHINE AND ROTARY ELECTRIC MACHINE INCLUDING STATOR

(71) Applicant: Hitachi Automotive Systems, Ltd., Hitachinaka (JP)

(72) Inventors: Tomohiro Fukuda, Hitachinaka (JP); Shin Onose, Hitachinaka (JP); Takeshi Konno, Hitachinaka (JP); Yasuhiro Shimada, Hitachinaka (JP); Kenichi Nakayama, Hitachinaka (JP); Hisaya Shimizu, Hitachinaka (JP); Mitsue Hashimoto, Hitachinaka (JP)

(73) Assignee: Hitachi Astemo, Ltd., Hitachinaka (JP)

(*) Notice: Subject to any disclaimer, the term of this patent is extended or adjusted under 35 U.S.C. 154(b) by 593 days.

(21) Appl. No.: 17/273,603

(22) PCT Filed: Jul. 29, 2019

(86) PCT No.: PCT/JP2019/029567
§ 371 (c)(1),
(2) Date: Mar. 4, 2021

(87) PCT Pub. No.: WO2020/054233
PCT Pub. Date: Mar. 19, 2020

(65) Prior Publication Data
US 2021/0359579 A1    Nov. 18, 2021

(30) Foreign Application Priority Data
Sep. 10, 2018   (JP) .............................. JP2018-168457

(51) Int. Cl.
*H02K 15/00*      (2006.01)
*H02K 1/16*       (2006.01)
(Continued)

(52) U.S. Cl.
CPC .......... *H02K 15/0081* (2013.01); *H02K 1/16* (2013.01); *H02K 3/02* (2013.01); *H02K 3/12* (2013.01);
(Continued)

(58) Field of Classification Search
CPC ............... H02K 15/00; H02K 15/0056; H02K 15/0068; H02K 15/0081; H02K 1/16;
(Continued)

(56) References Cited

U.S. PATENT DOCUMENTS

2008/0170952 A1*  7/2008  Jung ....................... H02K 3/30
                                                       427/178
2011/0181144 A1   7/2011  Ishizuka et al.
(Continued)

FOREIGN PATENT DOCUMENTS

EP      3 240 147 A1    11/2017
JP      2009-81980 A    4/2009
(Continued)

OTHER PUBLICATIONS

International Search Report (PCT/ISA/210) issued in PCT Application No. PCT/JP2019/029567 dated Dec. 3, 2019 with English translation (five (5) pages).
(Continued)

Primary Examiner — Tulsidas C Patel
Assistant Examiner — Joshua Kiel M Rodriguez
(74) Attorney, Agent, or Firm — Crowell & Moring LLP

(57) ABSTRACT

This disclosure is directed to a stator of a rotary electric machine. The stator includes a stator coil having a welding portion of segment conductors. Each of the segment conductors includes an exposed conductor wire portion. The exposed conductor includes a root portion adjacent to an insulating coating. A thickness of the insulating coating is 50 μm or more. The predetermined amount of displacement is
(Continued)

1±0.4 times or 2±0.4 times the thickness of the insulating coating. A length of the transition portion is 0.5 times or more and 2 times or less of a thickness of the conductor wire.

10 Claims, 10 Drawing Sheets

(51) Int. Cl.
*H02K 3/02* (2006.01)
*H02K 3/12* (2006.01)
*H02K 3/28* (2006.01)
*H02K 3/38* (2006.01)
*H02K 3/48* (2006.01)
*H02K 3/50* (2006.01)
*H02K 15/02* (2006.01)
*H02K 15/10* (2006.01)

(52) U.S. Cl.
CPC ............... *H02K 3/28* (2013.01); *H02K 3/38* (2013.01); *H02K 3/48* (2013.01); *H02K 3/50* (2013.01); *H02K 15/024* (2013.01); *H02K 15/105* (2013.01); *H02K 2213/03* (2013.01)

(58) Field of Classification Search
CPC .. H02K 3/02; H02K 3/04; H02K 3/12; H02K 3/28; H02K 3/32; H02K 3/38; H02K 3/48; H02K 3/46; H02K 3/50; H02K 15/024; H02K 15/10; H02K 15/105; H02K 2213/03
See application file for complete search history.

(56) References Cited

U.S. PATENT DOCUMENTS

| | | | |
|---|---|---|---|
| 2014/0035406 A1 | | 2/2014 | Ishizuka et al. |
| 2017/0346358 A1* | | 11/2017 | Fukuda ............. H02K 15/0081 |
| 2019/0036428 A1 | | 1/2019 | Murata et al. |

FOREIGN PATENT DOCUMENTS

| | | | | |
|---|---|---|---|---|
| JP | 2011-152001 A | | 8/2011 |
| JP | 2012090511 A | * | 5/2012 |
| JP | 2014-30318 A | | 2/2014 |
| JP | 2014-107876 A | | 6/2014 |
| JP | 2016-189657 A | | 11/2016 |
| WO | WO 2017/159864 A1 | | 9/2017 |

OTHER PUBLICATIONS

Japanese-language Written Opinion (PCT/ISA/237) issued in PCT Application No. PCT/JP2019/029567 dated Dec. 3, 2019 (five (5) pages).
Extended European Search Report issued in European Application No. 19860336.7 dated Mar. 9, 2022 (11 pages).

* cited by examiner

FIG. 5
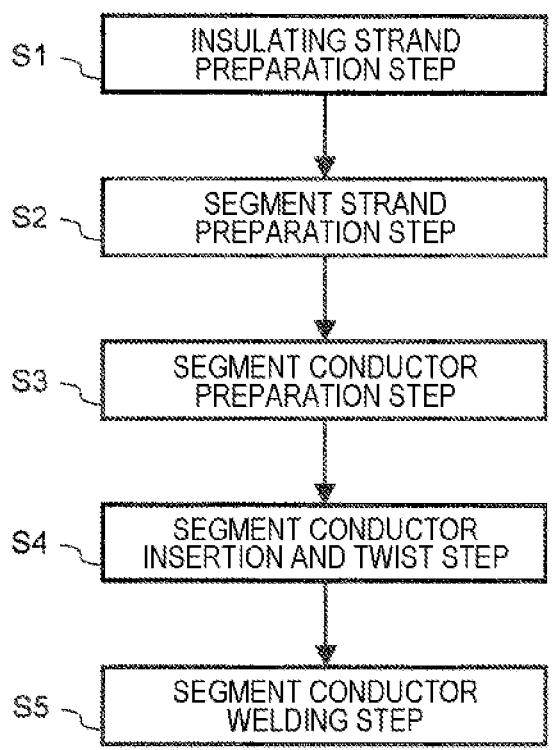
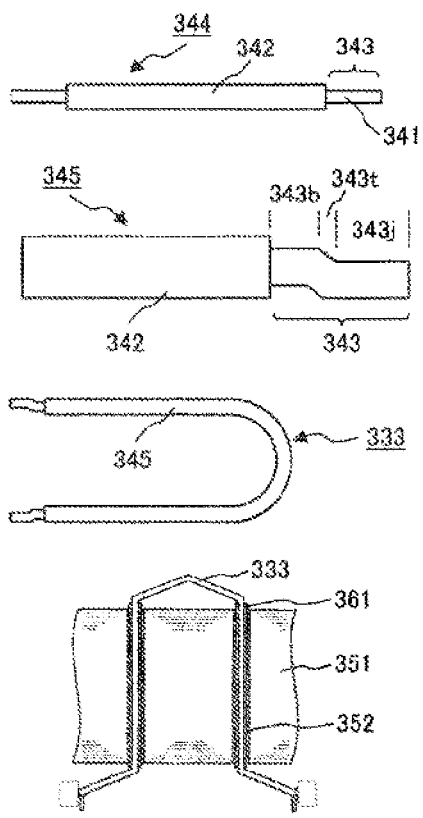

STATOR OF ROTARY ELECTRIC MACHINE AND ROTARY ELECTRIC MACHINE INCLUDING STATOR

TECHNICAL FIELD

The present invention relates to a rotary electric machine, and more particularly to a stator that contributes to miniaturization and high output of a rotary electric machine, and a rotary electric machine including the stator.

BACKGROUND ART

An example of a rotary electric machine (for example, a motor) includes a field winding-type rotary electric machine. The field winding-type rotary electric machine has a mechanism in which a stator coil is arranged in a plurality of stator slots formed in a stator core, and when a voltage is applied to the stator coil, a rotating magnetic field is generated, and a rotor is rotated by the rotating magnetic field.

In recent years, there has been a strong demand for miniaturization of the rotary electric machine (particularly, reducing a length in a rotation axis direction), and in order to meet the demand, a winding form of the stator coil has become complicated. Further, although there is a strong demand for cost reduction in the rotary electric machine, a manufacturing yield tends to decrease due to the complicated winding form of the stator coil, and there has been an object of improving manufacturability of the stator. For example, in a step of welding segment conductors in an end portion of the stator coil, there has been a problem in that an insulating coating of the segment conductors may be thermally damaged, and as a result, an electric insulation between the segment conductors to be electrically insulated is reduced.

Various techniques have been researched and developed to achieve the object. For example, PTL 1 (JP 2009-081980 A) discloses a stator of a rotary electric machine which includes a stator core including a plurality of slots and a plurality of coil segments mounted in respective slots to form a stator winding, in which bonding portions of the coil segments are bonded side by side outside the slot, a spacer having conductivity is provided between the bonding portions of the coil segments in order to form a gap between the adjacent portions other than the bonding portions of the coil segments, and the bonding portions of the coil segments and the spacer are bonded by welding or a bonding material.

PTL 2 (JP 2014-107876 A) discloses a method for manufacturing a stator in which a coil segment is inserted into a stator core, and segment ends of the coil segment are welded to form a coil, in which when a peeling portion, in which an insulating coating is peeled off from the segment ends of the coil segment inserted into the stator core, is gripped by a clamping jig extending in a radial direction of the stator core, and the segment ends are welded, a welding region on a side where an end of the peeling portion is disposed and a cooling region on a side where the stator core is disposed are separated from each other in the clamping jig and then the segment ends are cooled by cooling means which is disposed in a side of the cooling region, the cooling means blowing a gas onto the segment ends in the side of the cooling region.

CITATION LIST

Patent Literature

PTL 1: JP 2009-081980 A
PTL 2: JP 2014-107876 A

SUMMARY OF INVENTION

Technical Problem

According to PTL 1, in the stator of a rotary electric machine, the coil segments can be reliably bonded to each other while maintaining a sufficient insulation interval except the bonding portion of the coil segment, and high-quality bonding without a short circuit can be achieved. According to PTL 2, it is possible to provide a method for manufacturing a stator in which heat effect generated at the time of welding a coil end portion can be suppressed, and a damage to the insulating coating of the segment can be suppressed without extending an axial length of a conductor segment.

On the other hand, a recent rotary electric machine is strongly required to have high output in addition to the above-mentioned miniaturization thereof, and the applied voltage is being increased in order to correspond to the high output. The increasing of the applied voltage means applying a large current to the segment conductor, and it is necessary to increase a cross-sectional area of the conductor and a thickness of the insulating coating. As a result, flexibility of the segment conductor is decreased more than before and heat capacity is increased more than before, and therefore, only with a simple combination of the related arts, manufacturability of the stator tends to be decreased, which is a big problem. In other words, in order to improve the manufacturability of the stator (that is, to meet the demand for cost reduction) in the rotary electric machine corresponding to the miniaturization and the high output, a new effort has been required.

In view of the above circumstances, an object of the present invention is to provide a stator of a rotary electric machine of which miniaturization, high output, and cost reduction are balanced at a higher level than the related art, and a rotary electric machine including the stator.

Solution to Problem (I) According to an aspect of the present invention, there is provided a stator of a rotary electric machine in which a stator coil is wound around a stator core. The stator coil includes a welding portion of segment conductors formed in a region of an end portion of the stator coil; each of the segment conductors includes an exposed conductor wire portion in which an insulating coating formed on an outer periphery of a conductor wire is removed in a vicinity of the welding portion; the exposed conductor wire portion on at least one side of a pair of the segment conductors forming the each welding portion includes, in a longitudinal direction of the conductor wire, a root portion adjacent to the insulating coating, a transition portion for offsetting a center axis of the conductor wire in a radial direction by a predetermined amount of displacement, and a bonding portion offset in the radial direction with respect to the root portion by the predetermined amount of displacement, and a boundary portion between the root portion and the transition portion and a boundary portion between the transition portion and the bonding portion have pressing marks; and the predetermined amount of displacement is "1±0.4" times or "2±0.4" times a thickness of the insulating coating.

The present invention can make the following improvements and modifications to the stator of a rotary electric machine (I) described above.

(i) A length of the root portion and a length of the transition portion are respectively shorter than a length of the bonding portion.

(ii) Opposite sides of a pair of the exposed conductor wire portions forming the welding portion include the transition portion, and the predetermined amount of displacement is "1±0.4" times the thickness of the insulating coating.

(iii) Only one side of a pair of the exposed conductor wire portions forming the welding portion includes the transition portion, and the predetermined amount of displacement is "2±0.4" times the thickness of the insulating coating.

(iv) The welding portion has an overlay welding structure including a welding metal formed of an alloy of the conductor wire and a welding material having a melting point lower than that of the conductor wire.

(v) The conductor wire is formed of oxygen-free copper or tough pitch copper.

(vi) The conductor wire is formed of aluminum or an aluminum alloy.

(II) According to another aspect of the present invention, there is provided a method for manufacturing a stator of a rotary electric machine. The method includes: an insulating strand preparation step of preparing an insulating strand including the exposed conductor wire portion by removing the insulating coating in a region of an opposite ends of an insulated wire, the insulated wire including the insulating coating formed on an outer periphery of the conductor wire and having a predetermined length; a segment strand preparation step of preparing a segment strand, of which the exposed conductor wire portion includes the root portion, the transition portion and bonding portion, by performing a press forming work on the exposed conductor wire portion of the prepared insulating strand; a segment conductor preparation step of preparing the segment conductor by performing a U-shape forming work on the prepared segment strand; a segment conductor insertion and twist step of inserting the prepared segment conductor into a slot of the stator core and performing a twisting work on a region which is the end portion of the stator coil; and a segment conductor welding step of welding the bonding portions of the segment conductor to form a welding portion of the stator coil.

(III) According to still another aspect of the present invention, there is provided a rotary electric machine including a stator, in which the stator is the above described stator of a rotary electric machine.

(IV) According to still another aspect of the present invention, there is provided a stator of a rotary electric machine in which a stator coil is wound around a stator core. The stator coil includes a welding portion of segment conductors formed in a region of an end portion of the stator coil; each of the segment conductors includes an exposed conductor wire portion in which an insulating coating formed on an outer periphery of a conductor wire is removed in a vicinity of the welding portion; the exposed conductor wire portion on at least one side of a pair of the segment conductors forming the each welding portion includes, in a longitudinal direction of the conductor wire, a root portion adjacent to the insulating coating, a transition portion for offsetting a center axis of the conductor wire in the radial direction by a predetermined amount of displacement, and a bonding portion offset in the radial direction with respect to the root portion by the predetermined amount of displacement, and a boundary portion between the root portion and the transition portion and a boundary portion between the transition portion and the bonding portion have pressing marks; and a length of the root portion and a length of the transition portion are respectively shorter than a length of the bonding portion.

Advantageous Effects of Invention

According to the present invention, the stator of a rotary electric machine, of which miniaturization, high output, and cost reduction are balanced at a higher level than the related art, can be provided.

The rotary electric machine, of which miniaturization, high output, and cost reduction are balanced at a higher level than the related art by using the stator, can be provided.

BRIEF DESCRIPTION OF DRAWINGS

FIG. 5 is a flow chart illustrating an example of steps in a method for manufacturing a stator of a rotary electric machine according to the present invention.

DESCRIPTION OF EMBODIMENTS

Figure 1:
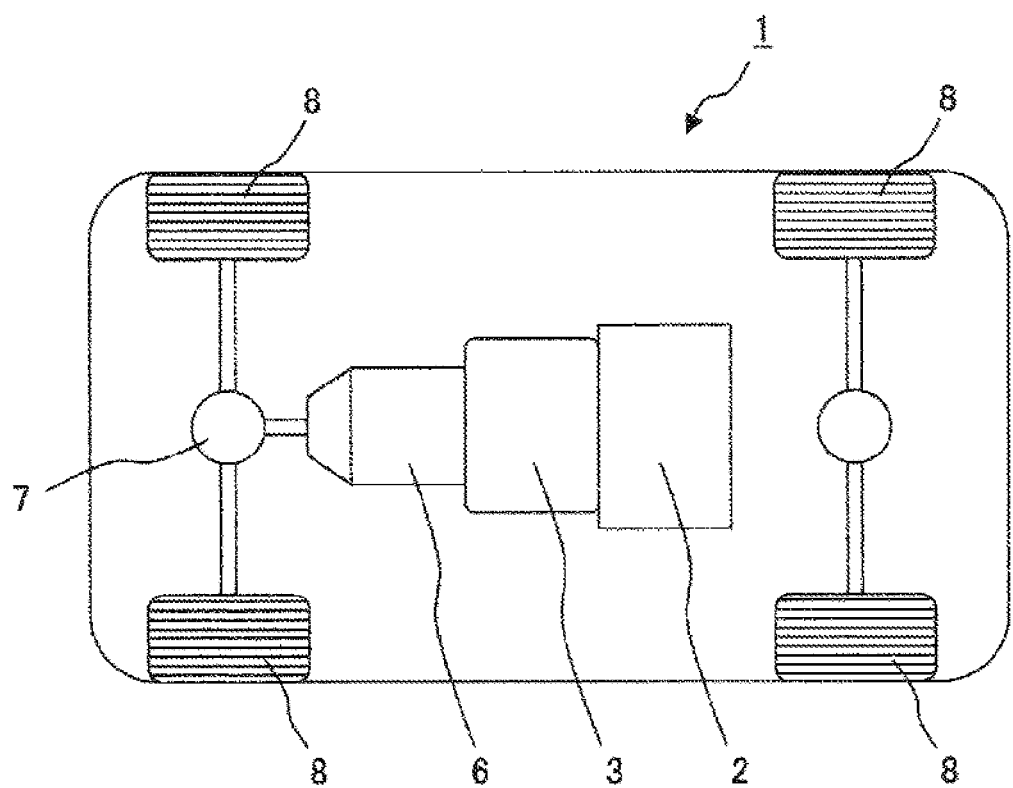
FIG. 1 is an example of a block diagram of a hybrid electric vehicle equipped with a rotary electric machine according to the present invention.

The present invention is not limited to the embodiments described in the present specification, and can be appropriately modified by a combination with a known technique or based on the known technique within a range not departing from the technical idea of the invention. Members having the same meaning are denoted by the same reference numerals, and overlapping descriptions will be omitted Hereinafter, in the embodiments according to the present invention, an example of a rotary electric machine for a hybrid electric vehicle will be specifically described with reference to the drawings. In the present specification, an "axial direction" indicates a direction along a rotation axis of a rotary electric machine, a "circumferential direction" indicates a direction along a rotation direction of a rotary electric machine, and a "radial direction" indicates a radial direction when a rotation axis of the rotary electric machine is set to be a center.

First Embodiment (Rotary Electric Machine)

FIG. 1 is an example of a block diagram of a hybrid electric vehicle equipped with a rotary electric machine according to the present invention. As shown in FIG. 1, a vehicle 1 of a hybrid electric vehicle is equipped with an engine 2 and a rotary electric machine 3 as a power source of a vehicle drive system. A rotation torque of the engine 2 and the rotary electric machine 3 is transmitted to wheels (driving wheels) 8 via a transmission (for example, a stepless transmission or a stepped transmission) and a differential gear 7. The rotary electric machine 3 is generally mounted between the engine 2 and the transmission 6 or in the transmission 6. Therefore, the rotary electric machine 3 is required to be miniaturized and have high output in order to minimize space occupation in the vehicle 1 and increase a driving force.

Although not shown in FIG. 1, a plurality of rotary electric machines may be incorporated in the drive system. For example, two rotary electric machines having different roles may be incorporated, and one rotary electric machine may be responsible for both power generation and vehicle drive, and the other rotary electric machine may be responsible for only vehicle drive.

Figure 2:
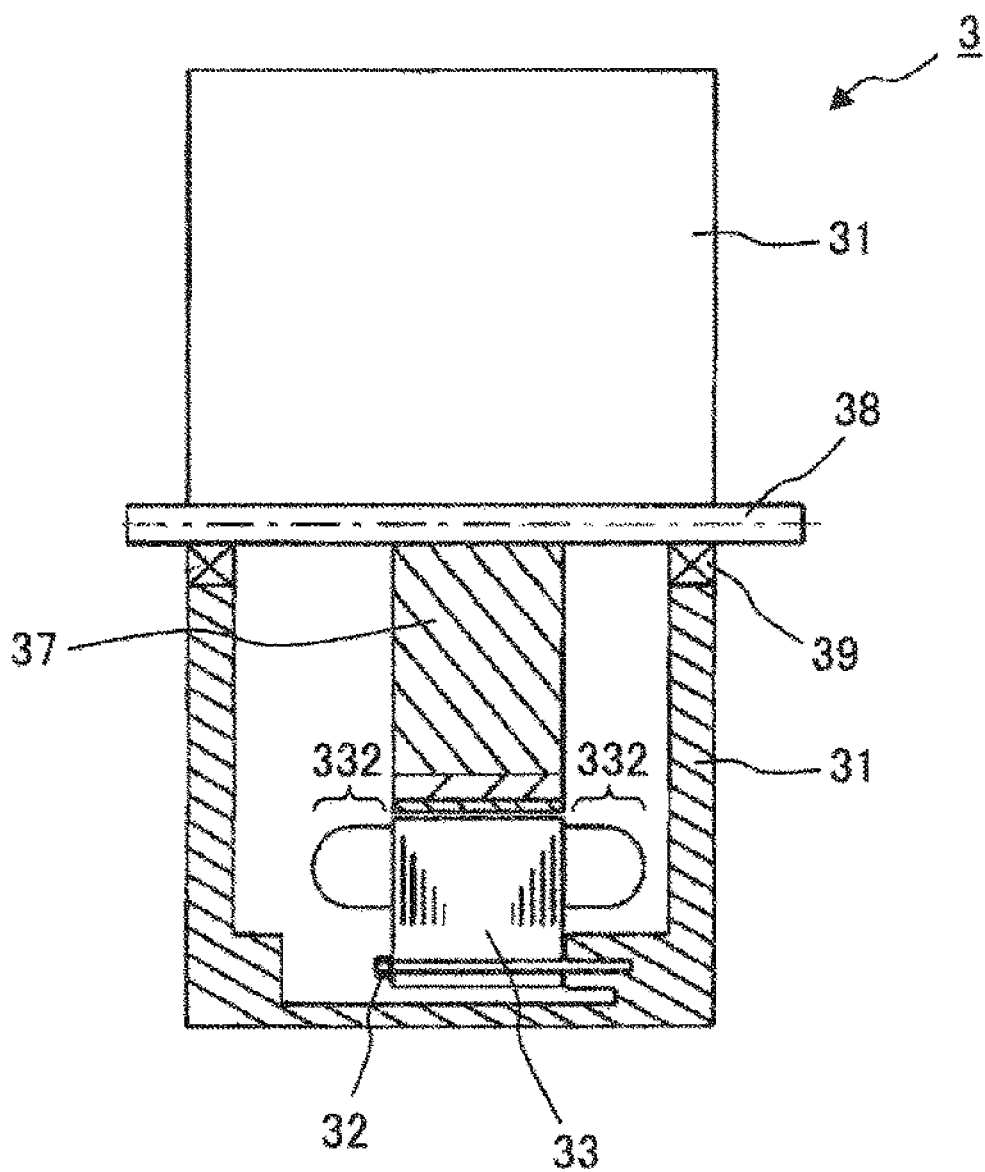
FIG. 2 is a partial schematic vertical cross-sectional view illustrating an example of a rotary electric machine according to the present invention.

FIG. 2 is a partial schematic vertical cross-sectional view illustrating an example of a rotary electric machine according to the present invention. A vertical cross section of the rotary electric machine is defined as a cross section in a rotation axis direction (a cross section in which a normal line is orthogonal to the rotation axis). As shown in FIG. 2, the rotary electric machine 3 has a structure in which a stator 33 is generally fixed to an outer peripheral side in a housing 31 by a fixing mechanism 32 (for example, a bolt), a rotor 37 is disposed inside the stator 33 in a radial direction, and a rotation shaft 38 disposed at a center of the rotor 37 is supported by the housing 31 via a bearing 39.

The stator 33 includes a cylindrical stator core 351 and a stator coil 331 wound around the stator core 351. The stator coil 331 is a general term for a plurality of coils wound such that polarities are alternately different from each other in a rotation direction. In the stator coil 331, a region protruding in an axial direction from the stator core 351 is referred to as an end portion 332. When a three-phase AC voltage (for example, 400 V to 800 V) is applied to the stator coil 331 to apply a large current (for example, 200 A to 400 A), a rotating magnetic field is generated, and a rotary electric machine 3 is operated as a motor.

The housing 31 of the rotary electric machine 3 does not have to be separate from the housing of the engine 2 and the housing of the transmission 6. For example, as shown in FIG. 1, when the rotary electric machine 3 is arranged between the engine 2 and the transmission 6, the housing 31 may be shared as the housing of the engine 2 or as the housing of the transmission 6. When the rotary electric machine 3 is mounted in the transmission 6, the housing 31 may be shared as the housing of the transmission 6.

In the rotary electric machine according to the present invention, the configuration of the rotor is not particularly limited, and a known rotor (for example, a permanent magnet type rotor including a permanent magnet, a winding type rotor including a field winding, a squirrel-cage rotor including a squirrel-cage conductor in which opposite ends of a conductor wire of the rotor are short-circuited, and a reluctance type rotor configured of only a ferromagnetic core and not including a permanent magnet) can be appropriately used.

(Stator)

Figure 3:
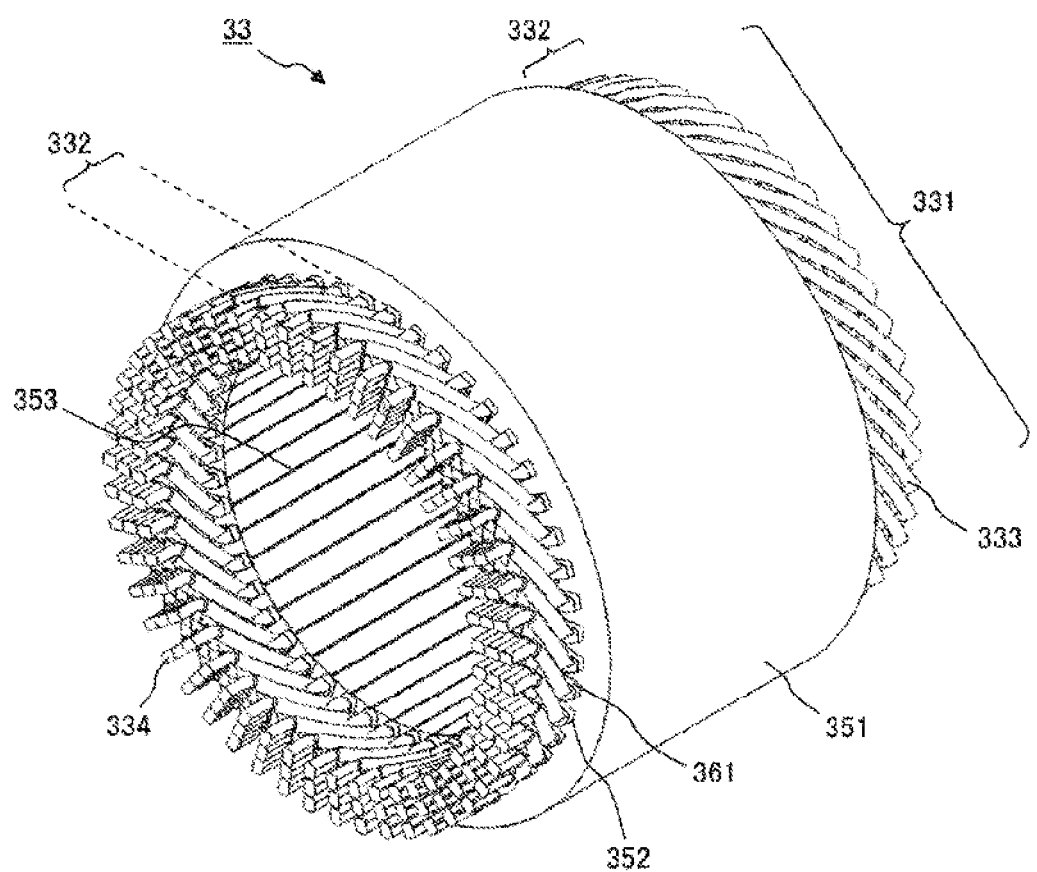
FIG. 3 is a schematic perspective view illustrating an example of a stator of a rotary electric machine according to the present invention.
Figure 4:
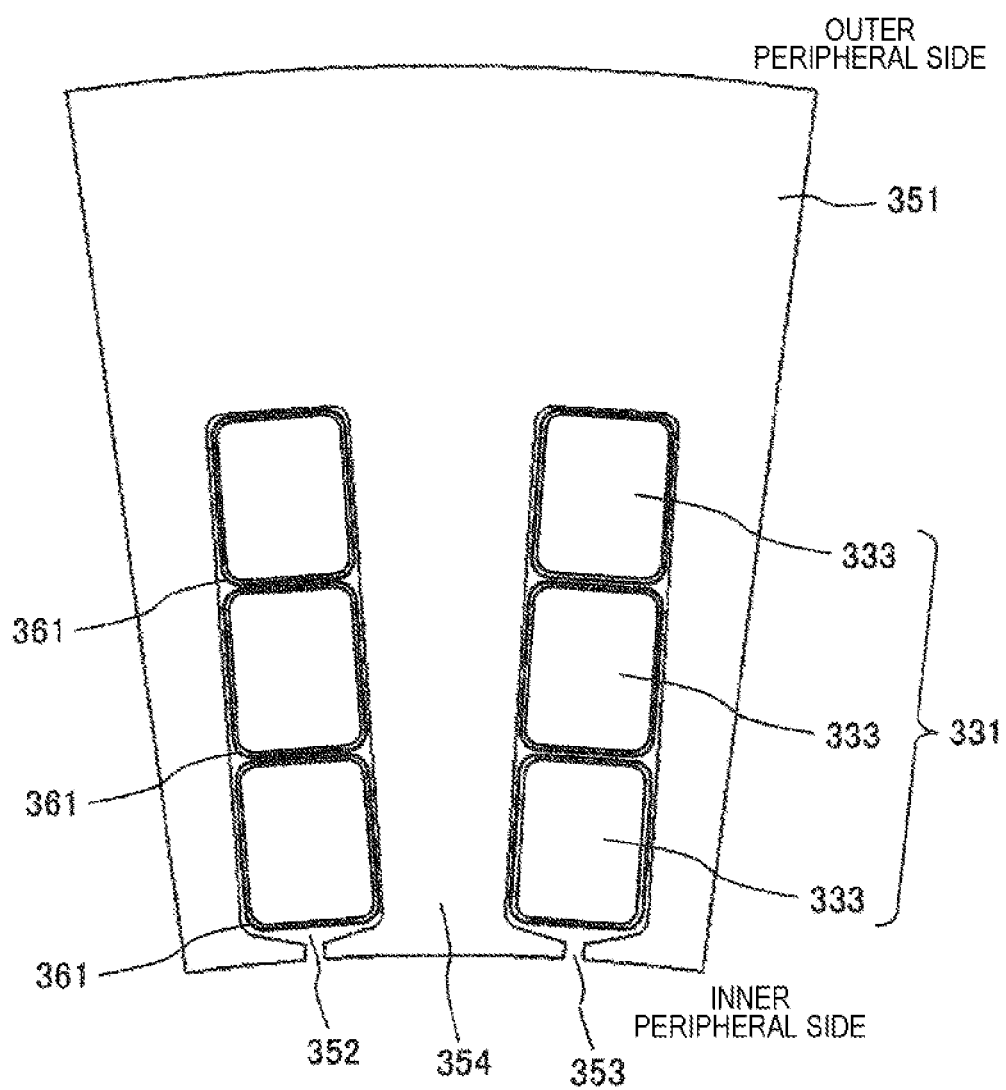
FIG. 4 is an enlarged schematic cross-sectional view of a slot region of a stator.

FIG. 3 is a schematic perspective view illustrating an example of a stator of a rotary electric machine according to the present invention, and FIG. 4 is an enlarged schematic transverse cross-sectional view of a slot region of a stator. A transverse cross section is defined as a cross section orthogonal to the axial direction (a cross section in which a normal line is parallel to the axial direction).

As shown in FIGS. 3 to 4, in the stator 33, the stator coil 331 is wound around a plurality of stator slots 352 (simply referred to as a slot) formed on an inner circumferential side of the stator core 351. The stator slot 352 is arranged and formed at a predetermined pitch in a circumferential direction of the stator core 351, and the stator slot 352 is a space formed penetrating in the axial direction, and a slit 353 extending in the axial direction is opened in an innermost circumferential portion.

The portion of the stator core 351 that defines a shape of the stator slot 352 is referred to as teeth 354.

The stator coil 331 is formed by bonding a plurality of segment conductors 333 by welding, and a welding portion 334 of the segment conductors 333 is generally formed collectively in a region of one end portion 332. The other end portion 332 of the stator coil 331 is usually a U-turn portion of each segment conductor 333. Opposite end portions 332 are generally twisted in order to minimize an axial length of the stator coil 331 (see FIG. 3).

A plurality of segment conductors 333 are arranged in each stator slot 352. For example, in FIG. 4, three segment conductors 333 corresponding to U-phase, V-phase and W-phase of three-phase AC are arranged. Further, from the viewpoint of preventing partial discharge between the segment conductor 333 and the stator core 351 and partial discharge between each phase (U phase, V phase, and W phase), it is preferable that an outer periphery of each segment conductor 333 is covered by an electric insulating material 361 (for example, an insulating paper) in an entire axial direction of the stator slot 352.

In the present invention, the number of segment conductors 333 arranged in each stator slot 352 is not limited to "three" as shown in FIGS. 3 to 4, but the number thereof may be appropriately set based on a design of the rotary electric machine 3. In other words, a winding form of the stator coil 331 (a bonding configuration of a plurality of segment conductors 333) is not particularly limited, and the winding form thereof is appropriately set based on a design of the rotary electric machine 3. The number of segment conductors 333 of each phase (U phase, V phase, and W phase) is not limited to "one" as shown in FIG. 4, and the number thereof may be divided plurally.

As the segment conductor 333, an insulated wire (so-called enameled wire), on which an electrical insulating coating formed of a resin material (for example, polyamide imide, polyimide, polyether ether ketone) is formed, is appropriately used for an outer periphery of the conductor wire formed of well electrically conductive metal (for example, oxygen-free copper, tough pitch copper, aluminum, aluminum alloy). A cross-sectional shape of the conductor wire and the insulated wire is not particularly limited, but from the viewpoint of a conductor space factor in the coil, it is preferable to use the conductor wire and the insulated wire having a rectangular cross-sectional shape.

In the stator 33 of the present invention, an exposed conductor wire portion of a pair of the segment conductors 333 configuring a welding portion 334 of the stator coil 331 (a region in which the insulating coating formed on the outer periphery of the conductor wire is removed) includes, in a longitudinal direction of the conductor wire, a root portion adjacent to the insulating coating, a transition portion for offsetting a center axis of the conductor wire in a radial direction by a predetermined amount of displacement, and a bonding portion offset in the radial direction with respect to the root portion by the predetermined amount of displacement, and there is a feature that a boundary portion between the root portion and the transition portion and a boundary portion between the transition portion and the bonding portion have pressing marks. The feature will be described in detail in a method for manufacturing a stator as follows.

(Method for Manufacturing Stator)

A method for manufacturing a stator according to the present invention will be described. FIG. 5 is a flow chart illustrating an example of steps in a method for manufacturing a stator of a rotary electric machine according to the present invention. As shown in FIG. 5, the method for manufacturing a stator of a rotary electric machine according to the present invention, generally, includes an insulating strand preparation step (S1) of preparing an insulating strand 344 of which opposite ends include an exposed conductor wire portion 343, a segment strand preparation step (S2) of preparing a segment strand 345 by performing a press forming work on the exposed conductor wire portion 343 of the prepared insulating strand 344, a segment conductor preparation step (S3) of preparing a segment conductor 333 by performing a U-shape forming work on the prepared segment strand 345, a segment conductor insertion and twist step (S4) of inserting the prepared segment conductor 333 into a slot 352 of a stator core 351 and performing a twisting work on a region which is an end portion 332 of a stator coil, and a segment conductor welding step (S5) of welding bonding portions of the segment conductor 333 to form a welding portion 334 of the stator coil.

Hereinafter, each step will be described in detail.

(Insulating Strand Preparation Step)

Step S1 is a step of preparing an insulating strand 344 including an exposed conductor wire portion 343 by removing an insulating coating 342 in a region of opposite ends of an insulated wire, the insulated wire including the insulating coating 342 formed on an outer periphery of a conductor wire 341 and having a predetermined length. A method for removing the insulating coating 342 is not particularly limited, and a known method may be appropriately used.

As the insulated wire to be used, an insulated wire having a cross-sectional area of the conductor wire 341 and a thickness of the insulating coating 342 suitable for the design of the rotary electric machine 3 (for example, a current and voltage of the stator coil 331) is selected. In recent years, due to a demand for miniaturization and high output of a rotary electric machine, the voltage and current of the stator coil are increased, and in the insulated wire to be used, the cross-sectional area of the conductor wire 341 and the thickness of the insulating coating 342 are increased. For example, the thickness of the insulating coating 342 has been about 15 μm to 45 μm in the past, but in recent years, it is 50 μm or more, or 100 μm or more.

(Segment Strand Preparation Step)

Step S2 is a step of preparing a segment strand 345 by performing a press forming work on an exposed conductor wire portion 343 of the insulating strand 344 prepared in step S1. More specifically, step S2 is a step of, in a longitudinal direction of an exposed conductor wire portion 343, performing a press forming work on a root portion 343b adjacent to the insulating coating 342, a transition portion 343t for offsetting a center axis of the conductor wire 341 by a predetermined amount of displacement, and a bonding portion 343j offset with respect to the root portion 343b by a predetermined amount of displacement.

Figure 6:
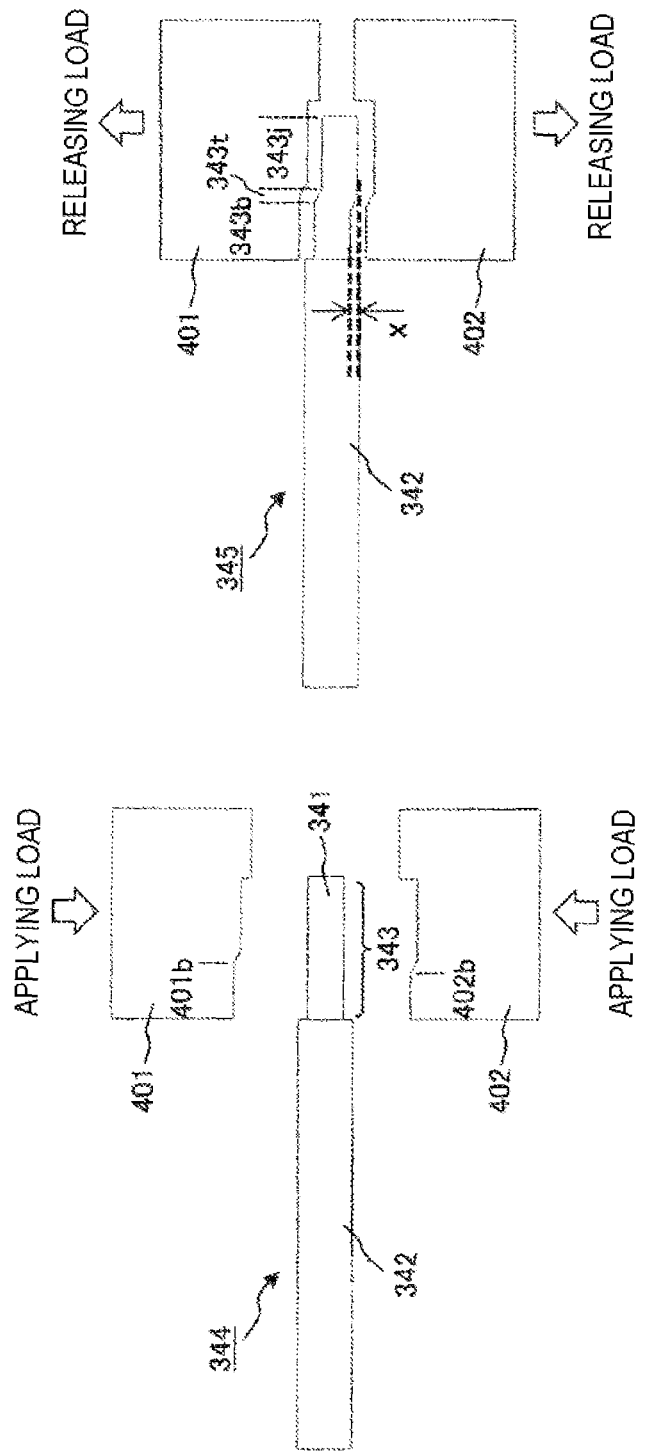
FIGS. 6A and 6B are a schematic view illustrating an example of a press forming work in a segment strand preparation step.

FIG. 6 is a schematic view illustrating an example of a press forming work in a segment strand preparation step. As shown in FIG. 6(a), first, at the time of the press forming work, the insulating strand 344 and a press dies 401 and 402 are disposed such that the press dies 401 and 402 do not sandwich the insulating coating 342 of the insulating strand 344. In other words, a root end of the exposed conductor wire portion 343 of the insulating strand 344 (a tip of the insulating coating 342) and ends of root regions 401b and 402b of the press dies 401 and 402 are disposed so as not to overlap with another. This is for preventing electric insulation from decreasing due to the crushing of the insulating coating 342.

When a load is applied to the exposed conductor wire portion 343 by the press dies 401 and 402 and then the load is released, as shown in FIG. 6(b), a root portion 343b, a transition portion 343t and a bonding portion 343j are formed in the exposed conductor wire portion 343. At this time, pressing marks caused by the press dies 401 and 402 remain at a boundary portion between the root portion 343b and the transition portion 343t and a boundary portion between the transition portion 343t and the bonding portion 343j.

When a thickness of the insulating coating 342 is 100 μm or more, a displacement amount x to be offset (a displacement amount x between the root portion 343b and the bonding portion 343j) is preferably "1±0.4" times the thickness of the insulating coating 342 (that is, 0.6 to 1.4 times), and more preferably "1±0.2" times the thickness of the insulating coating 342 (that is, 0.8 to 1.2 times). When the offset displacement amount x is "1±0.4" times the thickness of the insulating coating 342, step S2 is performed on the exposed conductor wire portion 343 at opposite ends of the insulating strand 344. When the displacement amount deviates from the regulation, the sufficient effect in the segment conductor welding step which will be described later cannot be obtained.

From the viewpoint of reducing an axial length of the end portion 332 of the stator coil 331, it is preferable that a length of the root portion 343b and a length of the transition portion 343t are respectively shorter than a length of the bonding portion 343j. Here, "the length of the root portion 343b, the transition portion 343t, and the bonding portion 343j" means a length of the conductor wire 341 in the longitudinal direction (a length in the right and left direction of the conductor wire 341 in FIG. 6). When the length of the root portion 343b and the length of the bonding portion 343j on one surface of the exposed conductor wire portion 343 (for example, the surface on the press die 401 side in FIG. 6) do not match with the length of the root portion 343b and the length of the bonding portion 343j on the other surface of the exposed conductor wire portion 343 (for example, the surface on the press die 402 side in FIG. 6), it is preferable to compare the longer portion of the root portion 343b with the shorter portion of the bonding portion 343j.

From the viewpoint of securing the displacement amount x at the transition portion 343t (in other words, stabilizing plastic deformation in the transition portion 343t), it is preferable that the length of the transition portion 343t is 0.5 times or more and 2 times or less the thickness of the conductor wire 341 (in FIG. 6, a vertical direction of the conductor wire 341).

(Segment Conductor Preparation Step)

Step S3 is a step of preparing a segment conductor 333 by performing a U-shape forming work on the segment strand 345 prepared in step S2. A method of the U-shaped forming work is not particularly limited, and a known method may be appropriately used.

(Segment Conductor Insertion and Twist Step)

Step S4 is a step of inserting the segment conductor 333 prepared in step S3 into a slot 352 of a stator core 351 and performing a twisting work on a region which is an end portion 332 of a stator coil 331. When the segment conductor 333 is inserted into the slot 352, it is preferable to insert an electric insulating material 361 with the segment conductor 333. A method for inserting the segment conductor 333 and the electric insulating material 361 into the slot 352 and the method for performing the twisting work on the region which is the end portion 332, are not particularly limited, and a known method may be appropriately used.

(Segment Conductor Welding Step)

Figure 7:
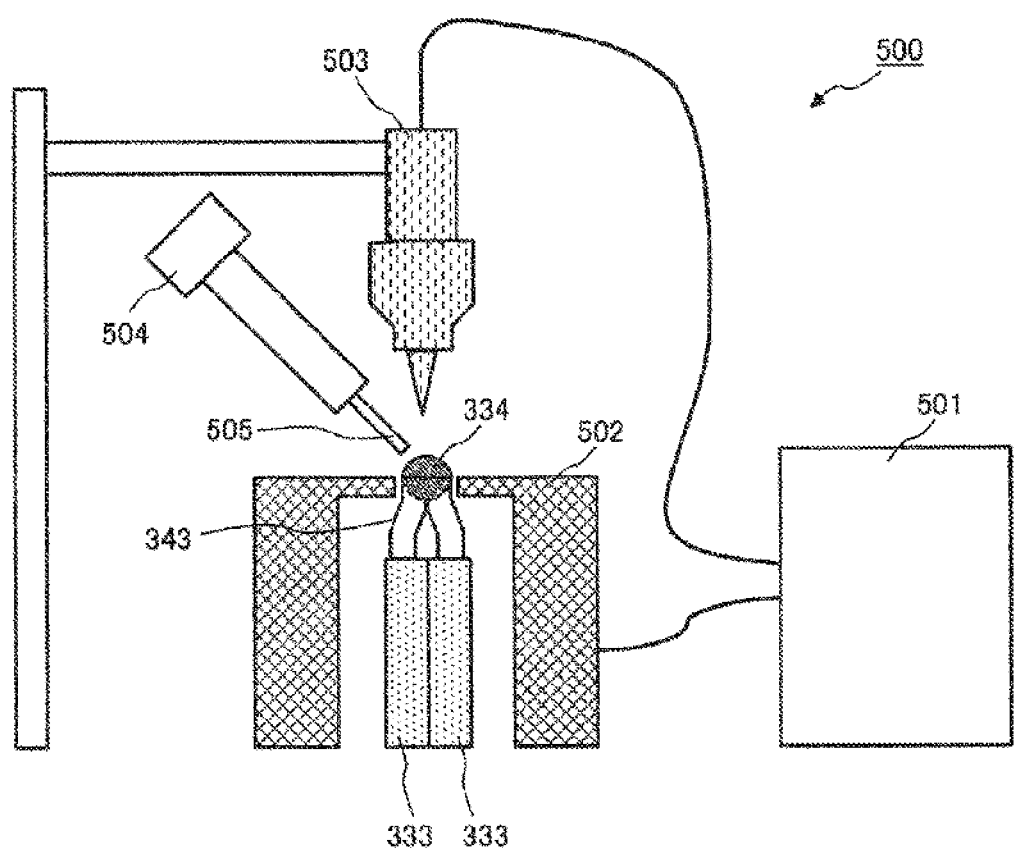
FIG. 7 is a schematic view illustrating an example of a welding method in a segment conductor welding step.

Step S5 is a step of forming a welding portion 334 of the stator coil 331 by welding the bonding portions 343j of the segment conductor 333 twisted in step S4. FIG. 7 is a schematic view illustrating an example of a welding method in a segment conductor welding step. As shown in FIG. 7, the bonding portions 343j of the segment conductor 333 are welded by an arc welder 500. More specifically, after a bonding portion grip jig 502 connected to a welding power source 501 grips the bonding portions 343j of the segment conductor 333, an arc is generated between an electrode 503 and the bonding portion 343j by applying a voltage between the electrode 503 connected to a welding power source 501 and the bonding portion grip jig 502, and the bonding portions 343j are welded to form a welding portion 334.

As described above, due to a demand for miniaturization and high output of a rotary electric machine, the cross-sectional area of the conductor wire 341 are increased. This means that heat capacity of the welded portion is increased more than before and a heat input amount for welding is required more than before. However, in step S5, it is a very important object to suppress a heat damage to the insulating coating 342 of the segment conductor 333 in the vicinity of the welding portion 334. In order to suppress the heat damage to the insulating coating 342, it is desirable to reduce the heat input amount for welding.

In order to achieve both of these contrary matters, at the time of welding, it is more preferable to perform overlay welding while supplying a welding material 505 having a melting point lower than that of the material of the conductor wire 341 by operating a bonding material supply device 504 at the same time. By performing the overlay welding, a sufficient amount of the welding material 505 having a melting point lower than that of the material of the conductor wire 341 can be supplied, and as a result, an alloy phase having a melting point lower than that of the material of the conductor wire 341 is generated on the welding portion 343j. This means that a heat amount required for welding can be reduced, which leads to a suppression of a heat damage to the insulating coating 342 in the vicinity of the bonding portion 343j.

A welding method is not limited to the arc welding, and other known welding (for example, an electron beam welding, a laser welding, and a plasma welding) can be appropriately used.

Figure 8A:
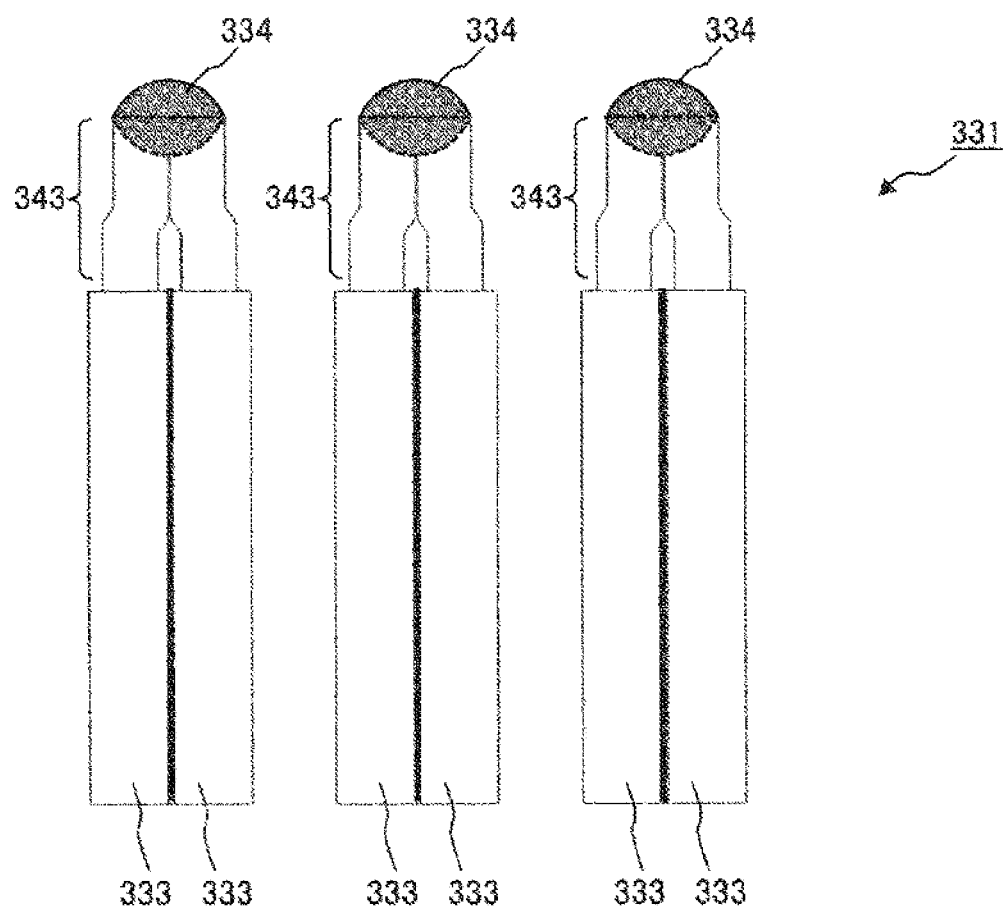
FIG. 8A is an enlarged schematic view in a circumferential direction illustrating an example of a welding portion of a stator coil in a first embodiment.
Figure 8B:
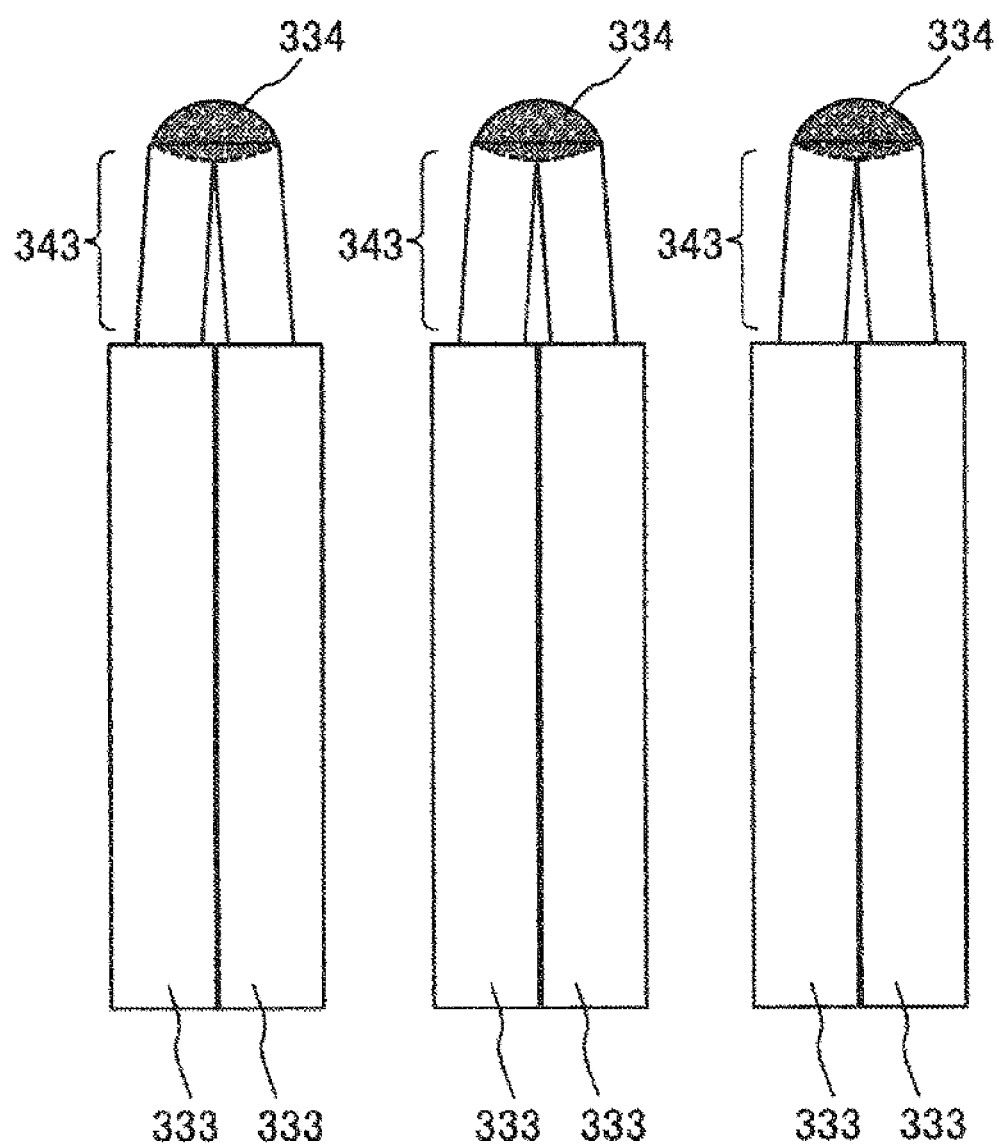
FIG. 8B is an enlarged schematic view in a circumferential direction illustrating an example of a welding portion of a stator coil in the related art.

FIG. 8A is an enlarged schematic view in a circumferential direction illustrating an example of a welding portion of a stator coil in a first embodiment, and FIG. 8B is an enlarged schematic view in a circumferential direction illustrating an example of a welding portion of a stator coil in the related art.

As shown in FIG. 8A, in the welding portion 334 of the stator coil 331 according to the first embodiment, there is an effect that the bonding portions 343j are easily aligned with each other (are abutted to each other) in the welding step since the exposed conductor wire portion 343 of each segment conductor 333 includes the root portion 343b, the transition portion 343t, and the bonding portion 343j, and the bonding portion 343j is offset with respect to the root portion 343b in the radial direction by a displacement amount of "1±0.4" times the thickness of the insulating coating 342. Further, the fact that the bonding portion 343j offset with respect to the root portion 343b is subjected to a forming work in advance means that there is substantially not an internal stress in a direction in which the welding portion 334 is peeled off between a pair of the segment conductors 333 forming the welding portion 334, and it has an effect of suppressing welding defects due to a misalignment during welding and welding peeling off after welding. These effects bring about an improvement of the manufacturability of the stator 33, an improvement of the manufacturing yield, and an improvement of the reliability, which leads to a reduction of the manufacturing cost.

Since an unnecessary compression stress is not applied between the insulating coatings 342 of a pair of the segment conductors 333, there is a secondary effect that deterioration of the electric insulation due to the crushing of the insulating coating 342 can be prevented.

On the other hand, as shown in FIG. 8B, in the welding portion 334 of the stator coil in the related art, in which the exposed conductor wire portion 343 is not subjected to the forming work in advance to include the root portion, transition portion, and the bonding portion, the entire exposed conductor wire portion 343 is gently displaced in the radial direction. A contact area between the exposed conductor wire portions 343 depends greatly on a gripping force of the bonding portion grip jig 502 in the welding step (a compression force abutting the exposed conductor wire portions 343 of a pair of the segment conductor) and a rigidity of the conductor wire 341.

In particular, in the segment conductor in which the cross-sectional area of the conductor wire 341 and the thickness of the insulating coating 342 are increased, a rigidity of the conductor wire 341 is high and a reaction force to the gripping force of the bonding portion grip jig 502 (a force resisting the force abutting the exposed conductor wire portions 343) is great. Therefore, a contact area of the exposed conductor wire portions 343 tends to be small. This hinders the formation of the welding portion 334 having a sufficiently large size and causes the welding peeling off after welding. The welding portion 334 having a sufficiently large size and the welding peeling off after welding cause the manufacturing yield and the reliability to decrease, which leads to an increase in the manufacturing cost.

When the gripping force of the bonding portion grip jig 502 is made to be very large in order to increase the contact area between the exposed conductor wire portions 343, an excessive compression stress is applied between the insulating coatings 342 of a pair of the segment conductors. Therefore, it may cause electric insulation to decrease due to the crushing of the insulating coating 342.

As described above, a stator of the rotary electric machine and the method for manufacturing the stator thereof according to the present invention are very effective techniques for the stator coil in which the cross-sectional area of the conductor wire 341 and the thickness of the insulating coating 342 are increased.

(Insulating Step of Exposed Conductor Wire Portion)

This step is a step of insulating each exposed conductor wire portion 343 including the welding portion 334 welded in step S5. A method of insulation treatment is not particularly limited, and a known method may be appropriately used. This step is not an essential step and is performed based on a design of the rotary electric machine 3.

Second Embodiment

The second embodiment is different from the first embodiment only in the shape of the exposed conductor wire portion forming the welding portion of the stator coil, but other configurations are the same. Therefore, only the shape of the welding portion and the exposed conductor wire portion will be described.

Figure 9:
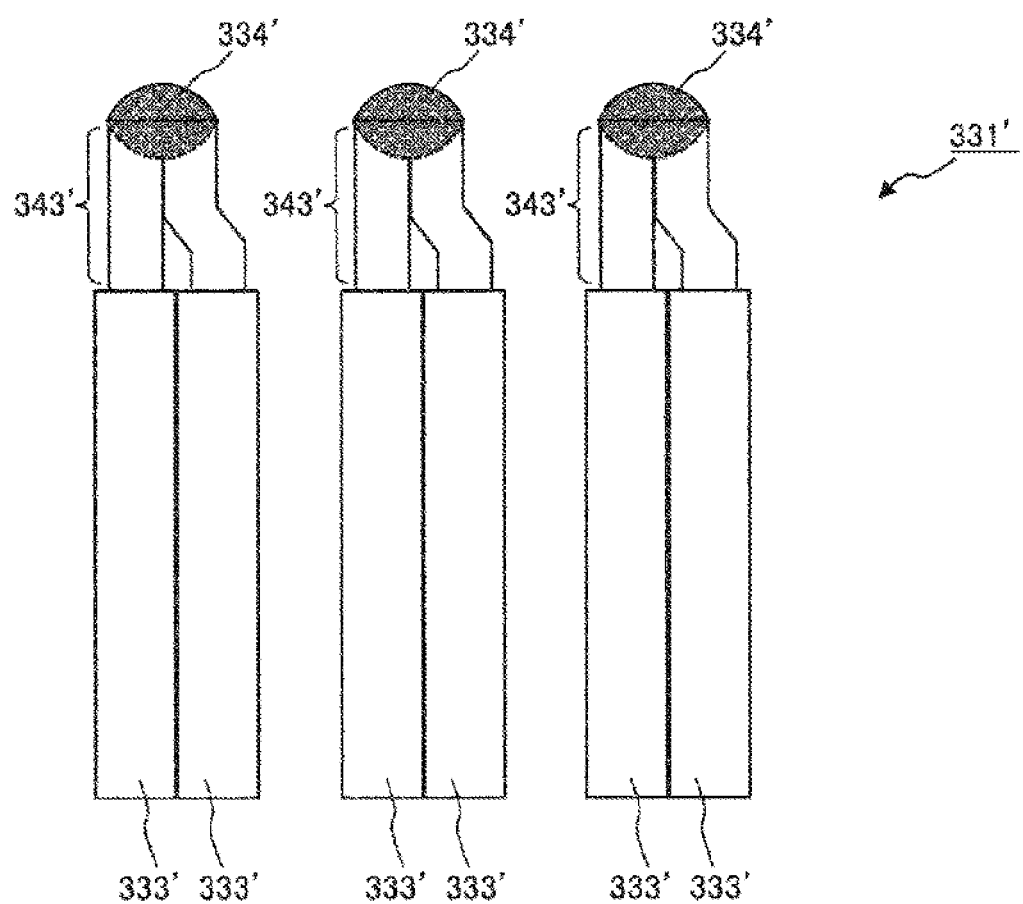
FIG. 9 is an enlarged schematic view in a circumferential direction illustrating an example of a welding portion of a stator coil in a second embodiment.

FIG. 9 is an enlarged schematic view in a circumferential direction illustrating an example of a welding portion of a stator coil in a second embodiment. As shown in FIG. 9, in a welding portion 334' of a stator coil 331' according to the second embodiment, there is a feature that an exposed conductor wire portion 343' on only one side of a pair of segment conductors 333' forming a welding portion 334' includes a root portion 343b, a transition portion 343t, and a bonding portion 343j, and the bonding portion 343j is offset with respect to the root portion 343b in the radial direction by a displacement amount x of "2±0.4" times the thickness of the insulating coating 342. The offset displacement amount x is more preferably "2±0.2" times. When the displacement amount deviates from the regulation, the sufficient effect in the segment conductor welding step cannot be obtained.

This embodiment is an effective technique when the thickness of the insulating coating 342 is 50 μm or more. Further, in the embodiment, in addition to the same effect as that of the first embodiment, a work amount of the press forming wok in the segment strand preparation step S2 is half of the work amount in the first embodiment. Therefore, it has an effect that the manufacturing cost can be further reduced.

The above-described embodiments are described for the purpose of assisting the understanding of the present invention, and the present invention is not limited to the described specific configurations. For example, it is possible to replace a part of the configuration of the embodiment with a configuration of the common general technical knowledge of those skilled in the art, or to add the configuration of the common general technical knowledge of those skilled in the art to the configuration of the embodiment. That is, in the present invention, with respect to a part of the configuration of the embodiment in the present specification, it is possible to delete the part of the configuration, replace the part of the configuration with another configuration, or add another configuration to the part of the configuration without departing from the scope of the technical idea of the invention.

REFERENCE SIGNS LIST 1 vehicle
2 engine
3 rotary electric machine
6 transmission
7 differential gear
8 wheel
31 housing
32 fixing mechanism
33 stator
37 rotor
38 rotation shaft
38 bearing
331, 331' stator coil
332 end portion
333, 333' segment conductor
334, 334' welding portion
341 conductor wire
342 insulating coating
343, 343' exposed conductor wire portion
343b root portion
343t transition portion
343j bonding portion
344 insulating strand
345 segment strand
351 stator core
352 stator slot
353 slit
354 teeth
401, 402 press die
401b, 402b root region
500 arc welder
501 welding power source
502 bonding portion grip jig
503 electrode
504 bonding material supply device
505 welding material

The invention claimed is:

1. A stator of a rotary electric machine in which a stator coil is wound around a stator core,
   wherein the stator coil includes a welding portion of segment conductors formed in a region of an end portion of the stator coil,
   each of the segment conductors includes an exposed conductor wire portion in which an insulating coating formed on an outer periphery of a conductor wire is removed in a vicinity of the welding portion,
   the exposed conductor wire portion on at least one side of a pair of the segment conductors forming the each welding portion includes, in a longitudinal direction of the conductor wire, a root portion adjacent to the insulating coating, a transition portion for offsetting a center axis of the conductor wire in a radial direction by a predetermined amount of displacement, and a bonding portion offset in the radial direction with respect to the root portion by the predetermined amount of displacement, and a boundary portion between the root portion and the transition portion and a boundary portion between the transition portion and the bonding portion have pressing marks, and
   a thickness of the insulating coating is 50 μm or more,
   the predetermined amount of displacement is 1±0.4 times or 2±0.4 times the thickness of the insulating coating, and
   a length of the transition portion is 0.5 times or more and 2 times or less of a thickness of the conductor wire.

2. The stator of a rotary electric machine according to claim 1, wherein a length of the root portion and a length of the transition portion are respectively shorter than a length of the bonding portion.

3. The stator of a rotary electric machine according to claim 1, wherein
the thickness of the insulating coating is 100 µm or more,
opposite sides of a pair of the exposed conductor wire portions forming the welding portion include the transition portion, and
the predetermined amount of displacement is 1±0.4 times the thickness of the insulating coating.

4. The stator of a rotary electric machine according to claim 1, wherein
only one side of a pair of the exposed conductor wire portions forming the welding portion includes the transition portion, and
the predetermined amount of displacement is 2±0.4 times the thickness of the insulating coating.

5. The stator of a rotary electric machine according to claim 1, wherein the welding portion has an overlay welding structure including a welding metal formed of an alloy of the conductor wire and a welding material having a melting point lower than that of the conductor wire.

6. The stator of a rotary electric machine according to claim 1, wherein the conductor wire is formed of oxygen-free copper or tough pitch copper.

7. The stator of a rotary electric machine according to claim 1, wherein the conductor wire is formed of aluminum or an aluminum alloy.

8. A method for manufacturing the stator of a rotary electric machine according to claim 1, the method comprising:
an insulating strand preparation step of preparing an insulating strand including the exposed conductor wire portion by removing the insulating coating in a region of opposite ends of an insulated wire, the insulated wire including the insulating coating formed on an outer periphery of the conductor wire and having a predetermined length;
a segment strand preparation step of preparing a segment strand, of which the exposed conductor wire portion includes the root portion, the transition portion and bonding portion, by performing a press forming work on the exposed conductor wire portion of the prepared insulating strand;
a segment conductor preparation step of preparing the segment conductor by performing a U-shape forming work on the prepared segment strand;
a segment conductor insertion and twist step of inserting the prepared segment conductor into a slot of the stator core and performing a twisting work on a region which is the end portion of the stator coil; and
a segment conductor welding step of welding the bonding portions of the segment conductor to form a welding portion of the stator coil.

9. A stator of a rotary electric machine in which a stator coil is wound around a stator core, wherein
the stator coil includes a welding portion of segment conductors formed in a region of an end portion of the stator coil,
each of the segment conductors includes an exposed conductor wire portion in which an insulating coating formed on an outer periphery of a conductor wire is removed in a vicinity of the welding portion,
the exposed conductor wire portion on at least one side of a pair of the segment conductors forming the each welding portion includes, in a longitudinal direction of the conductor wire, a root portion adjacent to the insulating coating, a transition portion for offsetting a center axis of the conductor wire in a radial direction by a predetermined amount of displacement, and a bonding portion offset in a radial direction with respect to the root portion by the predetermined amount of displacement, and a boundary portion between the root portion and the transition portion and a boundary portion between the transition portion and the bonding portion have pressing marks,
a thickness of the insulating coating is 50 µm or more,
a length of the transition portion is 0.5 times or more and 2 times or less of the thickness of the conductor wire, and
a length of the root portion and a length of the transition portion are respectively shorter than a length of the bonding portion.

10. The stator of a rotary electric machine according to claim 9, wherein the welding portion has an overlay welding structure including a welding metal formed of an alloy of the conductor wire and a welding material having a melting point lower than that of the conductor wire.

* * * * *